(12) United States Patent
Otsuki et al.

(10) Patent No.: US 11,804,088 B2
(45) Date of Patent: Oct. 31, 2023

(54) MOBILE BODY, DELIVERY SYSTEM, AND DELIVERY METHOD

(71) Applicant: TOYOTA JIDOSHA KABUSHIKI KAISHA, Toyota (JP)

(72) Inventors: Nobuhisa Otsuki, Toyota (JP); Haeyeon Lee, Tokyo-to (JP); Kunihiro Iwamoto, Nagakute (JP); Yuta Itozawa, Nagoya (JP); Hirotaka Komura, Tokyo-to (JP); Yutaro Takagi, Tokyo-to (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/721,607

(22) Filed: Apr. 15, 2022

(65) Prior Publication Data
US 2022/0366747 A1 Nov. 17, 2022

(30) Foreign Application Priority Data
May 17, 2021 (JP) .................................. 2021-083238

(51) Int. Cl.
*G07C 9/00* (2020.01)
*B60W 60/00* (2020.01)

(52) U.S. Cl.
CPC ... *G07C 9/00896* (2013.01); *B60W 60/00256* (2020.02); *G07C 2009/0092* (2013.01)

(58) Field of Classification Search
None
See application file for complete search history.

(56) References Cited

U.S. PATENT DOCUMENTS

| 11,200,532 | B2* | 12/2021 | Peterson | B60Q 1/507 |
|---|---|---|---|---|
| 2018/0351941 | A1* | 12/2018 | Chhabra | H04L 9/38 |
| 2019/0033856 | A1* | 1/2019 | Ferguson | G06Q 10/08355 |
| 2021/0150655 | A1* | 5/2021 | Matsutani | G06Q 50/28 |

FOREIGN PATENT DOCUMENTS

| JP | 2005-154037 A | 6/2005 |
|---|---|---|
| JP | 2006-043042 A | 2/2006 |
| JP | 6164599 B1 | 7/2017 |

* cited by examiner

*Primary Examiner* — K. Wong
(74) *Attorney, Agent, or Firm* — Sughrue Mion, PLLC (57) ABSTRACT

A mobile body delivers a package to a designated destination by autonomous traveling. When the mobile body arrives at the destination, door status information including opening/closing status of an entrance door of the destination is acquired, and it is determined whether the entrance door of the destination has been opened based on the acquired door status information. When the entrance door has been opened, a delivery of the package to the destination is authenticated, and a locking device for regulating the delivery of the package from the mobile body is unlocked.

8 Claims, 7 Drawing Sheets

MOBILE BODY, DELIVERY SYSTEM, AND DELIVERY METHOD

CROSS-REFERENCE TO RELATED APPLICATION

The present application claims priority under 35 U.S.C. § 119 to Japanese Patent Application No. 2021-083238, filed May 17, 2021, the contents of which application are incorporated herein by reference in their entirety.

BACKGROUND

Field

The present disclosure relates to a technique for delivering a package to a designated destination by a mobile body traveling autonomously.

Background Art

JP6164599B discloses techniques related to home delivery system. The home delivery system according to this technique specifies a home delivery box corresponding to a delivery destination from a plurality of home delivery boxes, and delivers a package to the specified home delivery box by a mobile body autonomously traveling.

SUMMARY

When a mobile body delivering a package meets a person at an entrance of a house to deliver the package, it is necessary to authenticate that the person is a recipient of the package for security reason. Since the technique of JP6164599B assumes delivery to a delivery box, it does not consider the actions to be taken by a mobile body in face-to-face delivery of packages.

The present disclosure has been made in view of the above-mentioned problems, and an object thereof is to provide a technique capable of performing authentication by a simple and reliable manner when a mobile body delivers a package face-to-face.

The present disclosure provides a mobile body for achieving the above purpose. A mobile body according to the present disclosure is a mobile body configured to travel autonomously and deliver a package to a designated destination. The mobile body includes one or more processors configured to perform an authentication processing to authenticate a delivery of the package when the mobile body arrives at the destination. In the authentication processing, the one or more processors is configured to acquire door status information, which is information on the opening/closing status of an entrance door of the destination, determine whether the entrance door of the destination has been opened based on the door status information, and authenticate delivery of the package to the destination when the entrance door has been opened.

In the mobile body according to the present disclosure, when a delivery of the package is authenticated in the authentication processing, the one or more processors may be configured to unlock a locking device for regulating a delivery of the package from the mobile body. The one or more processors may be configured to cancel an authentication in the authentication processing and lock the locking device when the package is not removed until a predetermined time elapses after unlocking the locking device. Alternatively, the one or more processors may be configured to, after the locking device is unlocked, determine whether the entrance door of the destination has been closed based on the door status information, and when the entrance door has been closed before handing over of the package, cancel an authentication in the authentication processing and lock the locking device.

In the mobile body according to the present disclosure, the destination information includes information concerning a designated recipient. In the authentication processing, the one or more processors may be configured to, when the entrance door has been opened, acquire personal information of a recipient facing the mobile body, verify the recipient against the designated recipient based on the personal Information, and when the recipient is the designated recipient, authenticate a delivery of the package. In addition, in the authentication processing, the one or more processors may be configured to, when the entrance door has been opened since before a start of the authentication processing, acquire personal information of a recipient facing the mobile body, verify the recipient against the designated recipient based on the personal information, and when the recipient is the designated recipient, authenticate a delivery of the package.

The present disclosure provides a delivery system for achieving the above object. The delivery system according to the present disclosure is a delivery system configured to include a mobile body configured to travel autonomously and deliver a package to a designated destination, and a management server connected to the mobile body via a communication network. The delivery system includes one or more processors configured to perform an authentication processing to authenticate a delivery of the package when the mobile body arrives at the destination. In the authentication processing, the one or more processors are configured to acquire door status information including opening/closing status of an entrance door of the destination, determine whether the entrance door of the destination has been opened based on the door status information, and authenticate a delivery of the package to the destination when the entrance door has been opened.

Also, the present disclosure provides a delivery method for achieving the above object. The delivery method according to the present disclosure is a delivery method for a computer to cause a mobile body to travel autonomously and deliver a package to a designated destination. When the mobile body arrives at the destination, the computer may be configured to execute acquiring door status information, which is information on the opening/closing status of an entrance door of the destination, determining whether the entrance door of the destination has been opened based on the door status information, and authenticating delivery of the package to the destination when the entrance door has been opened.

Also, the present disclosure provides a delivery program for achieving the above object. The delivery program according to the present disclosure is a delivery program that causes a computer to deliver a package by traveling autonomously a mobile body to a designated destination. When the mobile body arrives at the destination, the delivery program causes the computer to execute acquiring door status information including opening/closing status of an entrance door of the destination, determining whether the entrance door of the destination has been opened based on the door status information, and authenticating delivery of the package to the destination when the entrance door has been opened.

According to the technique of the present disclosure, when the mobile body arrives at the designated destination, the delivery of the package to the destination is authenticated in response to the opening of the entrance door of the destination. This makes it possible to perform authentication in a simple and reliable manner when the mobile body delivering a package delivers the package face-to-face.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically.

1. First Embodiment 1-1. Configuration of the Delivery System

Figure 1:
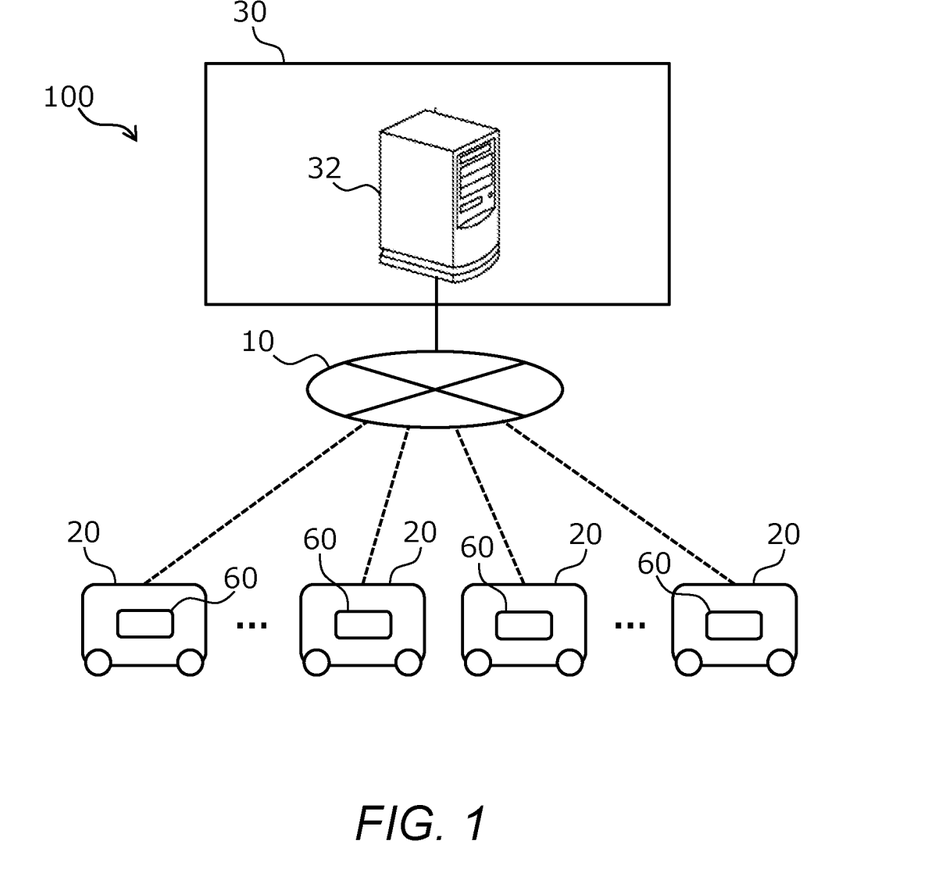
FIG. 1 is a diagram illustrating a configuration of a delivery system according to a first embodiment of the present disclosure.

FIG. 1 is a diagram illustrating a configuration of a delivery system according to a first embodiment of the present disclosure. A delivery system 100 is a system for delivering packages 60 using delivery robots 20. The delivery robot 20 is a small mobile body capable of autonomous traveling. The delivery robot 20 is configured with, for example, a carriage having a plurality of wheels and a container for housing a package 60. There is no limitation on the type of package 60 to be delivered by the delivery system 100, as long as delivery by the delivery robot 20 is physically possible and legally acceptable. For example, various articles such as sundry goods, foods, liquors, books, electrical appliances, dishes, and the like can be delivered as a package 60.

The delivery system 100 operates one or more delivery robots 20. All delivery robots 20 are connected to a management server 32 via a communications network 10, including 4G and 5G. The management server 32 is, for example, installed in a monitoring center 30 for monitoring for monitoring the operation status of the delivery robots 20.

Figure 2:
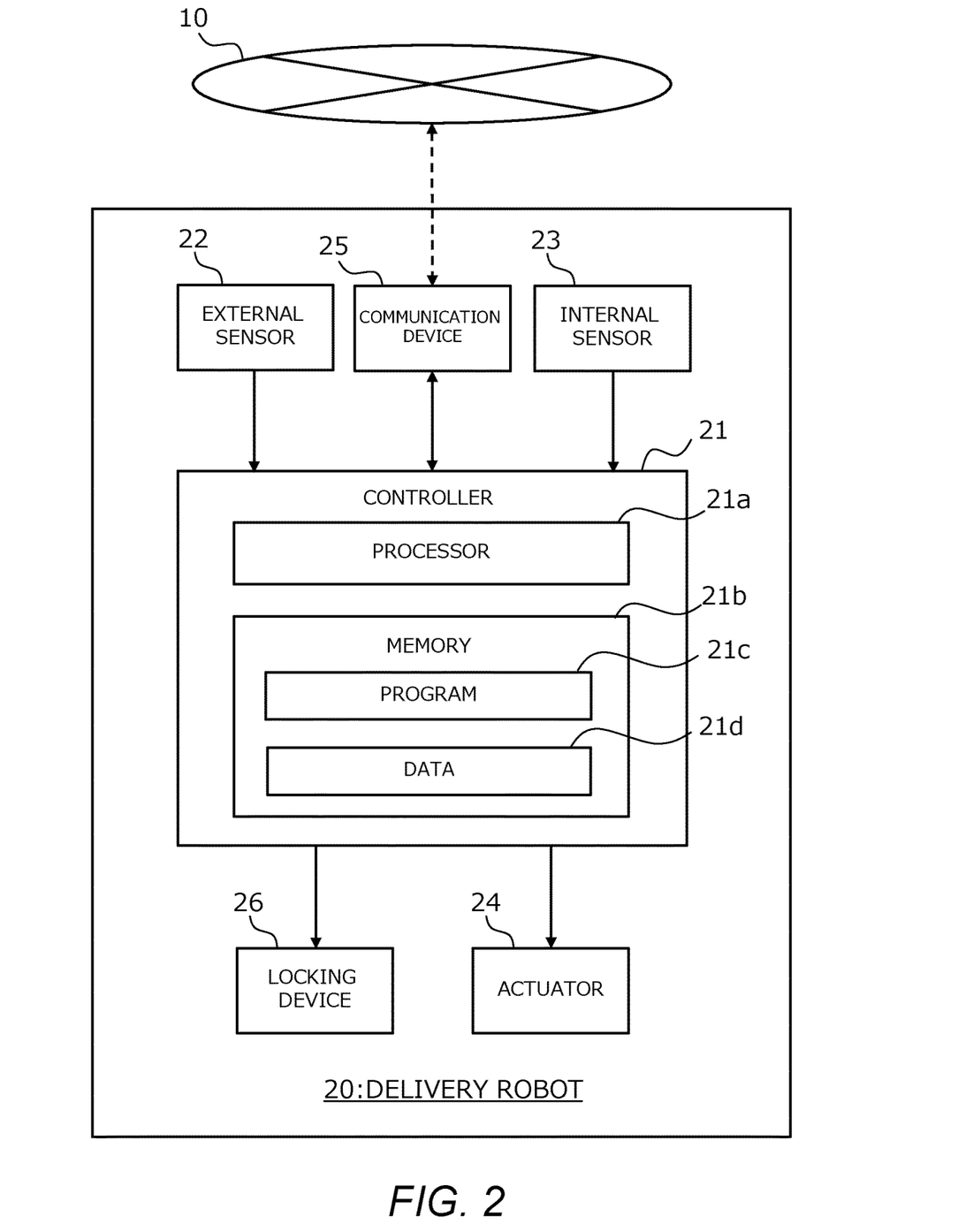
FIG. 2 is a block diagram illustrating an example of a configuration of a delivery robot.

FIG. 2 is a block diagram illustrating an example of a configuration of a delivery robot 20; The delivery robot 20 includes a controller 21 as a computer. The controller 21 is a set of a plurality of ECUs (Electronic Control Unit) mounted on the delivery robot 20. The delivery robot 20 also includes an external sensor 22, an internal sensor 23, an actuator 24, a communication device 25, and a locking device 26. These are connected to the controller 21.

The controller 21 includes one or more processors 21a (hereinafter simply referred to as a processor 21a) and one or more memories 21b (hereinafter simply referred to as a memory 21b) coupled to the processor 21a. The memory 21b stores one or more programs 21c (hereinafter, simply referred to as a program 21c) executable by the processor 21a and various related data 21d.

When the processor 21a executes the program 21c, various kinds of processing performed by the processor 21a are realized. The program 21c includes, for example, a program for causing the delivery robot 20 to travel autonomously. The data 21d includes, for example, map data used in autonomous traveling. The memory 21b includes a non-transitory computer-readable storage medium that includes a main storage device and an auxiliary storage device. The program 21c may be stored in the main storage device or may be stored in the auxiliary storage device.

The external sensor 22 includes a perception sensor that acquires information for perceiving surrounding conditions of the delivery robot 20. The perception sensor includes a camera for photographing surroundings of the delivery robot 20, particularly in front of the delivery robot 20. Examples of the perception sensor other than the camera include a LiDAR (Laser Imaging Detection and Ranging) and a millimeter-wave radar. The external sensor 22 also includes a location sensor for detecting the location and orientation of the delivery robot 20. As the location sensor, a Global Positioning System (GPS) sensor is exemplified. Information acquired by the external sensor 22 is transmitted to the controller 21.

The inner sensor 23 includes a state sensor that acquires information about the motion of the delivery robot 20. As the state sensor, for example, a wheel speed sensor, an acceleration sensor, an angular velocity sensor, and a steering angle sensor are exemplified. The acceleration sensor and the angular velocity sensor may constitute an IMU. Information acquired by the internal sensor 23 is transmitted to the controller 21. The information acquired by the inner sensor 23 and the information acquired by the external sensor 22 are used as information for autonomous traveling.

The actuator 24 includes a steering device for steering the delivery robot 20, a driving device for driving the delivery robot 20, and a braking device for braking the delivery robot 20. The actuator 24 may be, for example, an electric motor provided for each wheel. In this case, the steering, the driving, and the braking of the delivery robot 20 can be realized by independently controlling the rotation of each wheel of the delivery robot 20. That is, the electric motor as the actuator 24 may function as the steering device, the driving device, and the braking device. The actuator 24 operates by a control signal transmitted from the controller 21.

The communication device 25 is a device for controlling wireless communication with the outside of the delivery robot 20. The communication device 25 communicates with the management server 32 via the communication network 10. Information processed by the controller 21 is transmitted to the management server 32 using the communication device 25. The information transmitted to the management server 32 includes monitoring information for monitoring the operation status of the delivery robot 20. The monitoring information includes, in addition to the information acquired by the external sensor 22 and the internal sensor 23, information acquired by calculation by the autonomous traveling program (e.g., target trajectory). Information processed by the management server 32 is taken into the controller 21 using the communication device 25. Also, when vehicle-to-vehicle communication with other delivery robots or road-to-vehicle communication with infrastructure facilities is required, communication with those external devices is also performed by the communication device 25.

The locking device 26 is a security device to prevent the package 60 from taking out of the delivery robot 20. The locking device 26 is, for example, a device for locking and unlocking the door of the accommodation box accommodating the package 60. The locking device 26 operates by a control signal transmitted from the controller 21.

Figure 3:
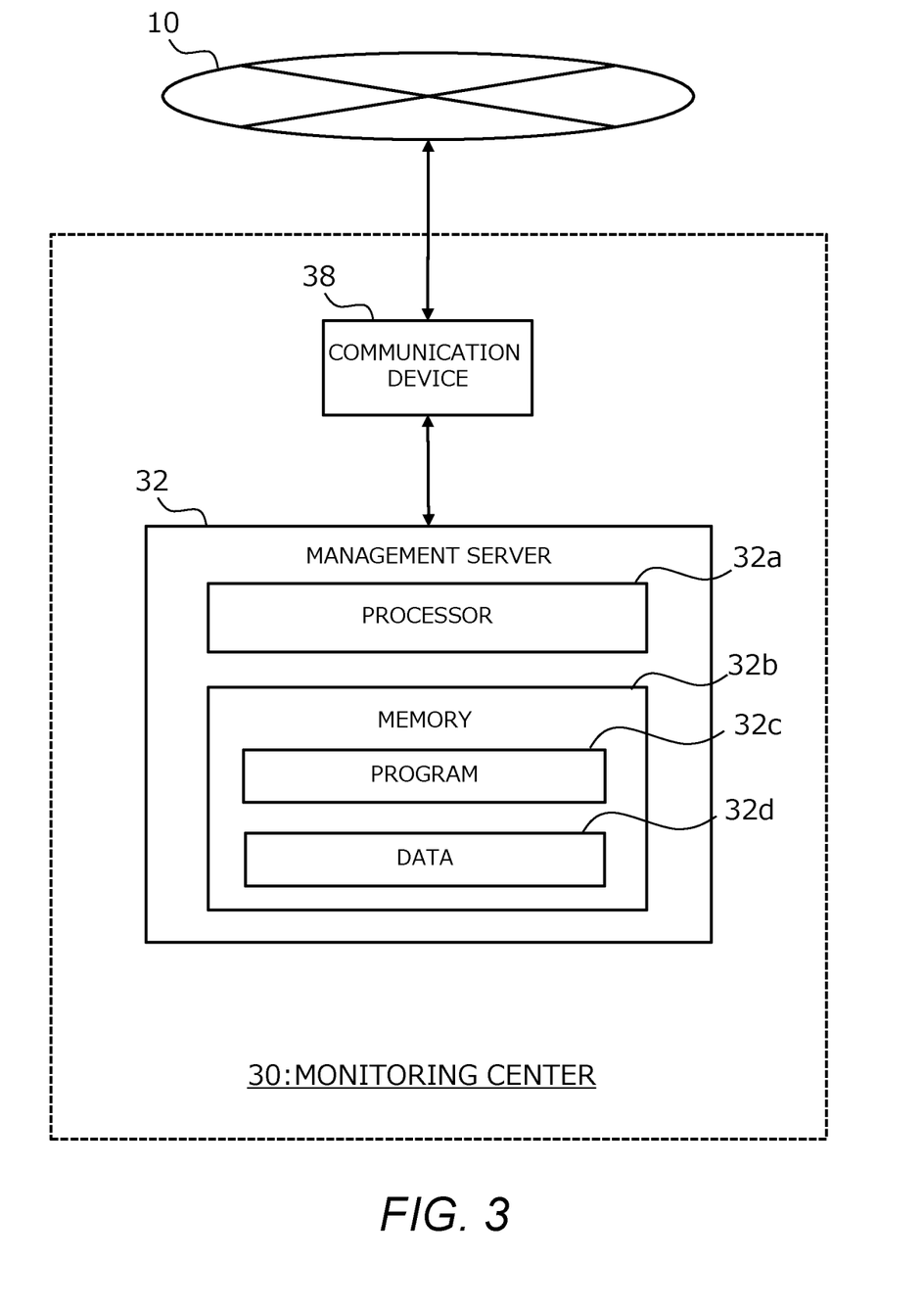
FIG. 3 a block diagram illustrating an example of a configuration of a management server.

FIG. 3 a block diagram illustrating an example of a configuration of a management server 32. The management server 32 is installed in the monitoring center 30 together with a communication device 38. The communication device 38 is a device for controlling communication with the outside of the monitoring center 30. The communication device 38 mediates communication between the management server 32 and the one or more delivery robots 20 performed via the communication network 10. In addition, the communication device 38 receives door status information, which will be described later, via the communication network 10. The information processed by the management server 32 is transmitted to the delivery robot 20 using the communication device 38. The information processed by the delivery robot 20 is taken into the management server 32 using the communication device 38.

The management server 32 may be a computer or a set of computers connected via a communication network. The management server 32 includes one or more processors 32a (hereinafter, simply referred to as a processor 32a) and one or more memories 32b (hereinafter, simply referred to as a memory 32b) coupled to the processor 32a. The memory 32b stores one or more programs 32c (hereinafter, simply referred to as a program 32c) executable by the processor 32a and various related data 32d.

When the processor 32a executes the program 32c, various kinds of processing performed by the processor 32a are realized. The program 32c includes a delivery program for authentication of a recipient of a destination, which will be described later. The data 32d includes order information of a client, which will be described later, and door status information of an entrance door of a house of the client. The memory 32b includes a non-transitory computer-readable storage medium that includes a main storage device and an auxiliary storage device. The program 32c may be stored in the main storage device or may be stored in the auxiliary storage device.

1-2. Operation of Package Delivery by Delivery System

Next, the operation of the package delivery by the delivery system 100 according to the first embodiment will be described with reference to FIG. 4. The delivery system 100 is a system that delivers a package using a delivery robot from a delivery source to a designated destination. In the example shown in FIG. 4, a delivery center 52 is exemplified as a delivery source. Further, although a detached housing 40 is exemplified as a destination, a apartment housing may be used as long as it is a house with an entrance door.

In the delivery system 100, the delivery of a package is performed upon receiving a delivery request from a user. Such a delivery request may be, for example, an order of articles from a user. The operation of the order is performed, for example, on a PC website or a smartphone application, and the order is transmitted to the management server 32. Order Information includes the article ID, the number of articles to be ordered, the address of the destination, and the phone number of the user. In addition, the order information may include desired delivery time (reserved delivery time) and receivable period (scheduled stay period of the user in the destination). When the user is away from home, scheduled return home time may be included in the order information. The management server 32 extracts only the information necessary for delivery of the article from the information included in the order information from the user, and transmits as a delivery instruction to the delivery source.

Figure 4:
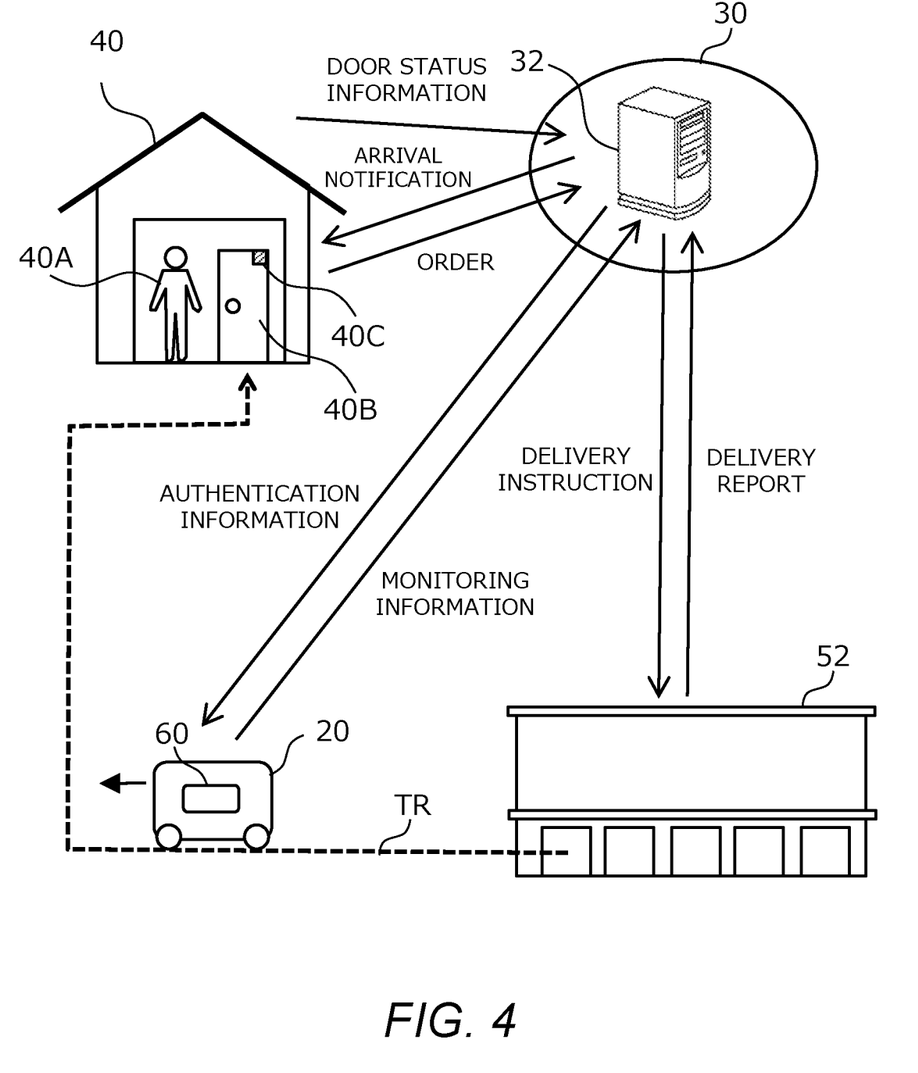
FIG. 4 is a diagram for explaining the operation of package delivery by the delivery system according to the first embodiment of the present disclosure.

In the example shown in FIG. 4, the management server 32 receives an order of an article from a resident 40A of the housing 40, transmits a delivery instruction to the delivery source to deliver the ordered article to the designated housing 40. In the example shown in FIG. 4, the delivery source is a delivery center 52 that handles the ordered article. In the delivery center 52, the ordered article is deposited as a package 60 to the delivery robot 20 responsible for delivery. Then, a delivery report is transmitted from the delivery center 52 to the management server 32. The delivery report includes the time when the delivery robot 20 departed the delivery center 52.

The delivery robot 20 loaded with the package 60 generates a traveling route TR from the delivery center 52 to the housing 40 which is the destination, based on the map data stored in the memory 21b. Then, the delivery robot 20 autonomously travels along the traveling route TR while generating target trajectories to avoid obstacles detected by the perception sensor. While moving by autonomous traveling, the delivery robot 20 continuously transmits the monitoring information to the management server 32.

The management server 32 transmits an arrival notification to the resident 40A of the housing 40 upon receiving the monitoring information indicating that the delivery robot 20 loaded with the package 60 has arrived in front of the housing 40. There is no limitation to the form of the arrival notification. The arrival notification may use, for example, a notification function of an application of a smartphone, or may be a notification using an electronic mail or a notification to an interface in a room. The resident 40A who has received the arrival notification opens an entrance door 40B of the residence 40 and responds to the delivery robot 20 face-to-face.

The delivery robot 20 is required to reliably deliver the package 60 to the resident 40A. For example, in front of the housing 40, the package 60 should not be erroneously delivered to a person other than the resident 40A. However, it is considered that some recipients feel troublesome when they are forced to perform additional operations for certification on the resident 40A as the recipient. In this manner, when the process of authenticating the person facing the delivery robot 20 as a resident 40A is not performed in a simple manner, problems may occur.

In the delivery system 100, an authentication function for solving the above-described problem is provided to the management server 32. The authentication function is a function in which the management server 32 authenticates that the person facing the delivery robot 20 is the resident of the designated destination. The authentication function by the management server 32 will be described below.

1-3. Certification Processing of Recipient

When the entrance door of the residence of the destination has been opened, it is considered that the person who responded is the resident of the residence. In response to the opening of the entrance door of the destination residence, the management server 32 executes authentication processing for authenticating that the person who responded to the opening of the entrance door is the resident of the residence, that is, the recipient of the package.

In the example shown in FIG. 4, a door status information acquiring device 40C is provided on the entrance door 40B of the housing 40. The door status information acquiring device 40C includes an opening/closing sensor for detecting door status information including the opening/closing state of the entrance door 40B, and a transmitting device for transmitting the door status information detected by the opening/closing sensor to the management server 32. When information indicating that the entrance door 40B has been opened is included in the door status information transmitted from the door status information acquiring device 40C, the managing server 32 transmits authentication information indicating that authentication for delivery of the package 60 has been obtained to the delivery robot 20. Having received the authentication information, the delivery robot 20 unlocks the locking device 26. As a result, the resident 40A can take out the package 60 from the delivery robot 20.

When the delivery of the package 60 is completed, the monitoring information including information indicating the completion of the delivery is transmitted from the delivery robot 20 to the management server 32. The delivery robot 20 that has completed the delivery of the package 60 returns home from the housing 40 to the delivery center 52 by traveling autonomously based on the map data stored in the memory 21b.

On the other hand, when the open front door 40B has been closed while the delivery of the package 60 is still incomplete, or when the package 60 is not received within a predetermined period after the entrance door 40B is opened, it can be assumed that the resident 40A does not intend to receive the package 60 or that the resident 40A is not present. In this case, since a security problem occurs in a state in which the locking device 26 is unlocked, the delivery robot 20 locks the locking device 26 again. As a result, the free removal of the package 60 from the delivery robot 20 is regulated.

Figure 5:
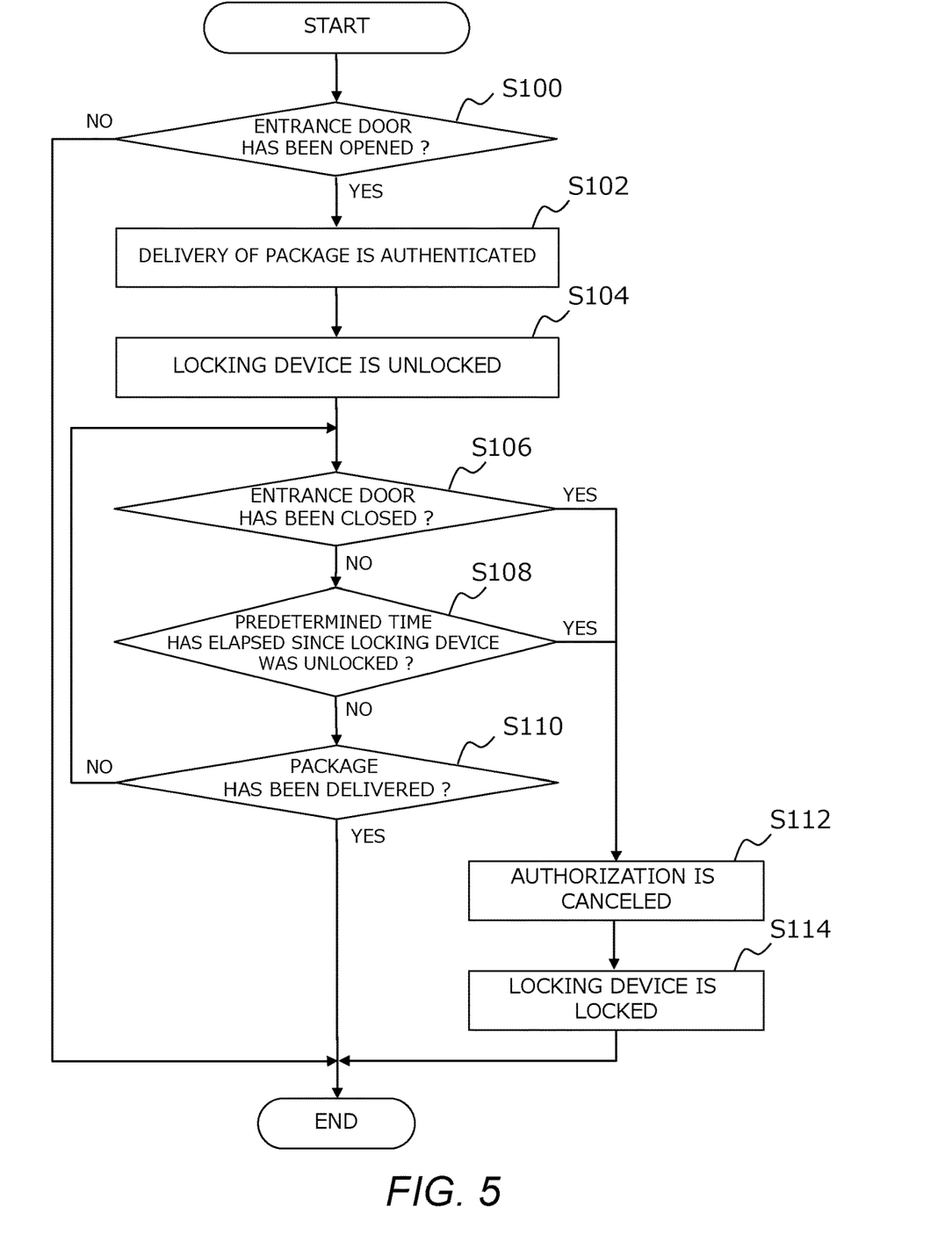
FIG. 5 is a flowchart showing a control routine of a authentication processing executed by the delivery system according to the first embodiment.

1-4. Specifically Processing of Authentication Processing Performed by Delivery System The flow of the authentication processing in the delivery system according to the first embodiment will be described with reference to FIG. 5. FIG. 5 is a flowchart showing a control routine of the authentication processing executed by the delivery system according to the first embodiment. The routine shown in FIG. 5 is a routine repeatedly executed when the delivery robot arrives before the destination. Here, the processing of the routine shown in FIG. 5 will be described, taking as an example a case where the delivery robot 20 shown in FIG. 4 delivers the package 60 to the housing 40 which is the destination. This flowchart is executed by the processor 32a of the management server 32 and the processor 21a of the delivery robot 20 in cooperation with each other. In addition, this flowchart also represents a delivery method according to the first embodiment of the present disclosure.

In step S100, the management server 32 determines whether the entrance door 40B has been opened based on the door status information received from the door status information acquiring device 40C of the housing 40. As a result, when the entrance door 40B has been closed, this routine is terminated. When the entrance door 40B has been opened, the process proceeds to step S102.

In step S102, the delivery of the package 60 is authenticated. Here, the management server 32 transmits the authentication information indicating that authentication has been obtained to the delivery robot 20. When the process of step S102 is completed, the process proceeds to step S104. In step S104, the locking device 26 of the delivery robot 20 is unlocked. As a result, the delivery robot 20 is ready to deliver the package 60 to the resident 40A. When the process of step S104 is completed, the process proceeds to step S106.

In step S106, the management server 32 determines whether the entrance door 40B has been closed based on the door status information received from the door status information acquiring device 40C of the housing 40. As a result, when the entrance door 40B has been closed, it is determined that the resident 40A does not intend to receive the package 60, and the process proceeds to step S112. On the other hand, when the entrance door 40B has not been closed, the process proceeds to step S108.

In step S108, it is determined whether a predetermined time has elapsed since the locking device 26 was unlocked. The predetermined time here is used as a waiting time when the resident 40A is estimated to have no intention of receiving the package 60, which is set in advance. As a result, when the predetermined time has elapsed, it is determined that the resident 40A does not intend to receive the package 60, and the process proceeds to step S112. On the other hand, when the predetermined time has not elapsed, it is determined that the resident 40A intends to receive the package 60, and the process proceeds to step S110.

In the step S110, it is determined whether the package 60 has been delivered from the delivery robot 20 based on delivery presence/absence information of the package included in the monitoring information. As a result, when the package 60 has not yet been delivered, the process returns to the step S106. On the other hand, when the package 60 has been delivered, it is determined that the delivery has been completed, and the routine ends.

In step S112, the authorization of the delivery of the package 60 is canceled. Here, the management server 32 transmits the authentication information indicating that the authentication has been canceled to the delivery robot 20. When the process of step S112 is completed, the process proceeds to step S114. In step S114, the locking device 26 of the delivery robot 20 is locked. As a result, the delivery robot 20 cannot freely take out the package 60. When the process of step S114 is completed, this routine is terminated.

As is apparent from the above description, according to the delivery system according to the first embodiment, the recipient of the package can be authenticated in a simple manner. As a result, it is possible to reliably deliver the package to the recipient while preventing the recipient of the destination from feeling troublesome.

2. Second Embodiment 2-1. Features of Second Embodiment

Next, a delivery system according to a second embodiment of the present disclosure will be described. The second embodiment is characterized in that when there is a designation of the recipient in the delivery request, in addition to the authentication processing based on the opening/closing status of the entrance door, a personal authentication of the recipient is performed. Hereinafter, the flow of the authentication processing in the delivery system according to the second embodiment will be described with reference to FIG. 6.

Figure 6:
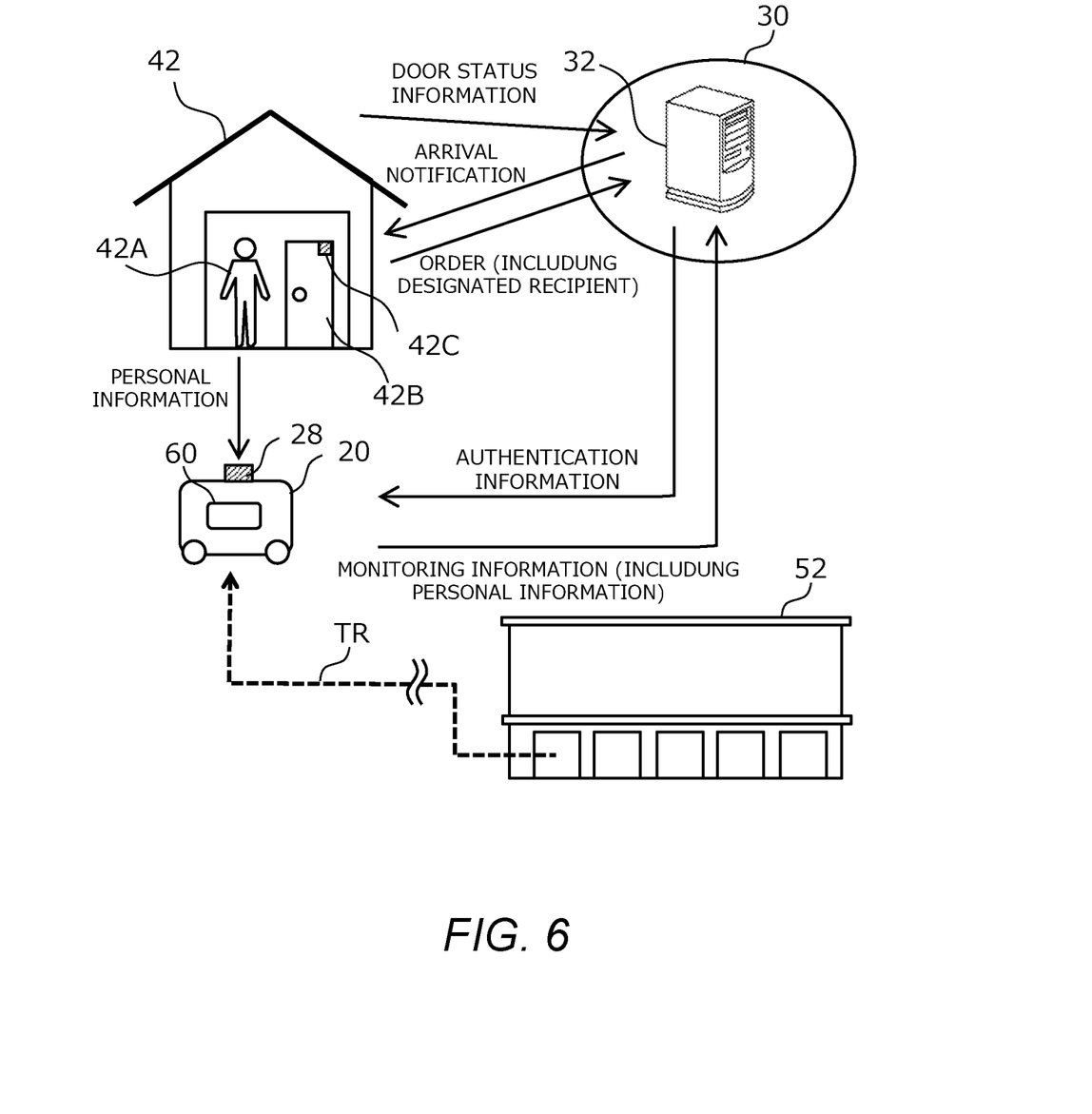
FIG. 6 is a diagram for explaining the operation of package delivery by the delivery system according to a second embodiment of the present disclosure.

FIG. 6 is a diagram for explaining the operation of package delivery by the delivery system according to a second embodiment of the present disclosure. In FIG. 6, elements common to those in FIG. 4 are denoted by the same reference numerals, and descriptions thereof are omitted or simplified.

In the delivery system 100, the delivery of a package is performed upon receiving an order from a user with a designation of a recipient. In the example shown in FIG. 6, an order in which a resident 42A of a detached housing 42 is designated as a designated recipient is transmitted to the management server 32. Order information at the time of the order includes the information of the article ordered as described above, as well as personal information to identify the designated recipient.

The management server 32 transmits a delivery instruction to the delivery center 52 to deliver the article to the housing 42. In the delivery center 52, the ordered article is deposited as a package 60 to the delivery robot 20 responsible for delivery. The delivery robot 20 loaded with the package 60 autonomously travels along the driving route TR to the housing 42. While moving by autonomous traveling, the delivery robot 20 continuously transmits the monitoring information to the management server 32.

The management server 32 transmits an arrival notification to the resident 42A of the housing 42 which is the designated recipient upon receiving the monitoring information indicating that the delivery robot 20 loaded with the package 60 has arrived in front of the housing 40. The arrival notification includes a notice that the resident 42A has been designated as the designated recipient. The resident 42A who has received the arrival notification opens an entrance door 42B of the residence 42 and responds to the delivery robot 20 face-to-face.

The delivery robot 20 is required to reliably deliver the package 60 to the resident 42A, which is the designated recipient, among the residents of the housing 42. However, the mere fact that the entrance door 42B of the housing 42 has been opened does not provide proof that a respondent is the resident 42A.

Therefore, in the delivery system 100, in addition to the authentication based on the door status information, the personal authentication based on the personal information of the respondent is performed. Examples of the personal information used for the personal authentication include an ID card, a face, a fingerprint, a voice print, a retina, a palm (vein) of a hand, and the like. The delivery robot 20 includes a reader 28 for reading personal information of the respondent. The personal information read by the reader 28 is transmitted to the management server 32 as part of the monitoring information. The management server 32 performs the personal authentication by verifying the personal information received from the delivery robot 20 against the personal information of the designated recipient received at the time of order. When both the authentication based on the door status information and the personal authentication based on the personal information are approved, then the management server 32 transmits the authentication information indicating that these authentications have been approved to the delivery robot 20. Having received the authentication information, the delivery robot 20 unlocks the locking device 26. As a result, the resident 42A as the designated recipient can take out the package 60 from the delivery robot 20.

Figure 7:
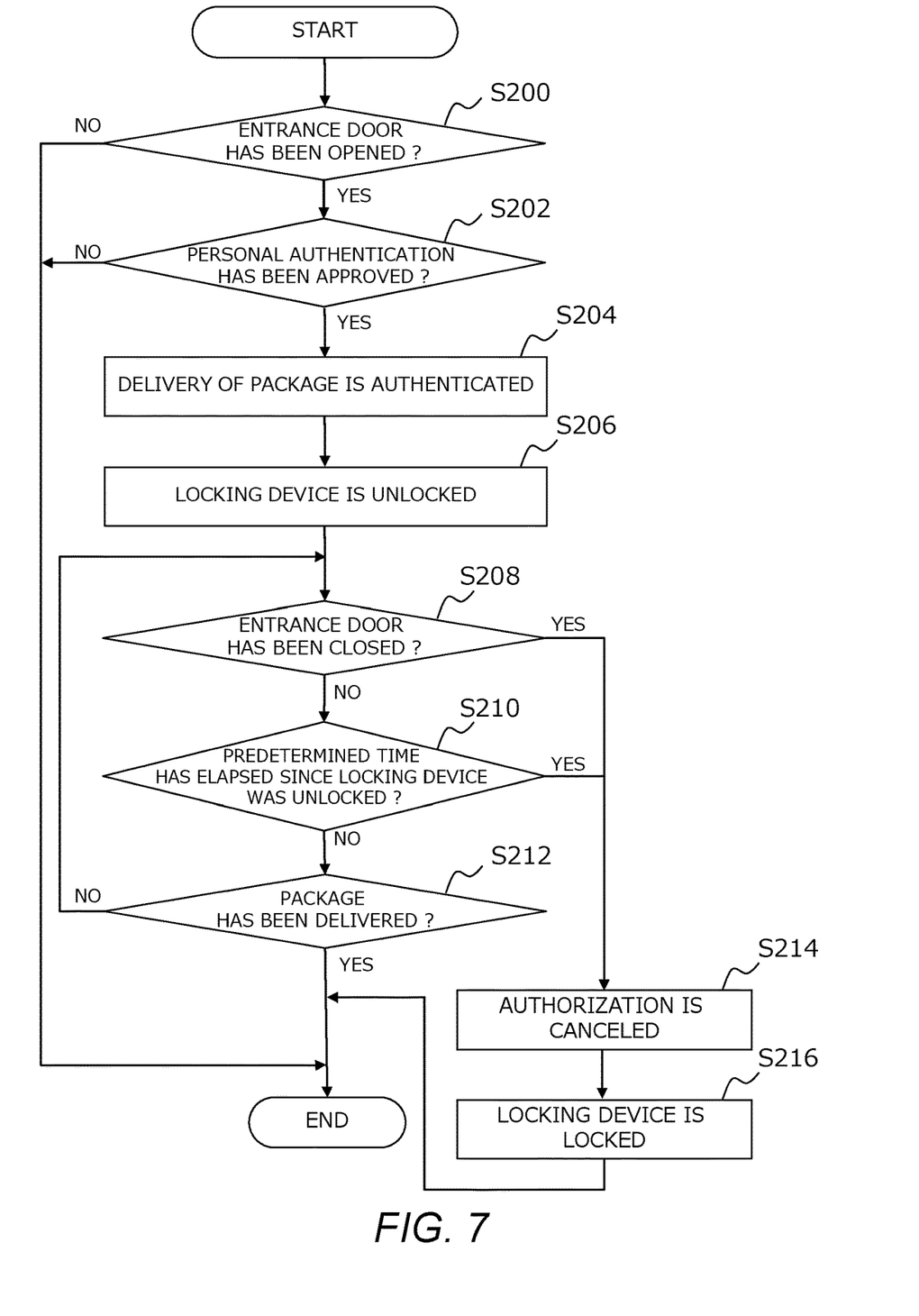
FIG. 7 is a flowchart showing a control routine of the authentication processing executed by the delivery system according to the second embodiment.

2-2. Specifically Processing of Authentication Processing Performed by Delivery System According to Second Embodiment The flow of the authentication processing in the delivery system according to the second embodiment will be described with reference to FIG. 7. FIG. 7 is a flowchart showing a control routine of the authentication processing executed by the delivery system according to the second embodiment. Similar to the routine shown in FIG. 5, the routine shown in FIG. 7 is a routine repeatedly executed when the delivery robot arrives before the destination. Here, the processing of the routine shown in FIG. 7 will be described, taking as an example a case where the delivery robot 20 shown in FIG. 6 delivers the package 60 to the resident 42A as the designated recipient. This flowchart is executed by the processor 32a of the management server 32 and the processor 21a of the delivery robot 20 in cooperation with each other. In addition, this flowchart also represents a delivery method according to the second embodiment of the present disclosure.

In step S200, the management server 32 determines whether the entrance door 42B has been opened based on the door status information received from the door status information acquiring device 42C of the housing 42. As a result, when the entrance door 42B has been closed, this routine is terminated. When the entrance door 42B has been opened, the process proceeds to step S202.

In step S202, the managing server 32 determines, based on the personal information received from the delivery robot 20, whether the personal authentication indicating that the recipient facing the delivery robot 20 is the designated recipient has been approved. As a result, when the personal authentication has not approved, it is determined that the recipient facing the delivery robot 20 is not the designated recipient, and the routine is terminated. On the other hand, when the personal authentication has been approved, it can be determined that the recipient facing the delivery robot 20 is the designated recipient. In this case, the processing proceeds to step S206 and the locking device 26 is opened. The processing from step S208 to step S216 is the same as the processing from step S106 to step S114 of the routines shown in FIG. 5.

As is apparent from the above description, according to the delivery system according to the second embodiment, the package can be reliably delivered to the designated recipient even if the recipient is designated.

3. Other Embodiments

All the functions of the authentication processing may be provided to the delivery robot 20. Alternatively, a part of the functions of the authentication processing included in the management server 32 may be provided to the delivery robot 20, and the controller 21 of the delivery robot 20 and the management server 32 may cooperate to execute each process.

The processing from step S106 to step S114 in FIG. 5 and the processing from step S208 to step S216 in FIG. 7 are not essential.

When the delivery robot 20 arrives at the destination, the entrance door 40B may have already been opened before the authentication processing starts. In such a case, the processing of step S202 in FIG. 7 should be mandatory, and the delivery should be authenticated upon receiving the personal information.

The door status information acquiring device may be configured as a part of a home security system or a home energy management system (HEMS) of a house.

What is claimed is:
1. A mobile body configured to travel autonomously and deliver a package to a designated destination, the mobile body comprising:

one or more processors configured to perform an authentication processing to authenticate a delivery of the package when the mobile body arrives at the destination, wherein, in the authentication processing, the one or more processors is configured to:
acquire door status information, which is information on the opening/closing status of an entrance door of the destination;
determine whether the entrance door of the destination has been opened based on the door status information; and
authenticate delivery of the package to the destination when the entrance door has been opened.

2. The mobile body according to claim 1,
wherein, when a delivery of the package is authenticated in the authentication processing, the one or more processors are configured to unlock a locking device for regulating a delivery of the package from the mobile body.

3. The mobile body according to claim 2,
wherein, the one or more processors are configured to cancel an authentication in the authentication processing and lock the locking device when the package is not removed until a predetermined time elapses after unlocking the locking device.

4. The mobile body according to claim 2,
wherein, the one or more processors are configured to:
after the locking device is unlocked, determine whether the entrance door of the destination has been closed based on the door status information; and
when the entrance door has been closed before handing over of the package, cancel an authentication in the authentication processing and lock the locking device.

5. The mobile body according to claim 1,
wherein, the destination information includes information concerning a designated recipient, and
wherein, in the authentication processing, the one or more processors are configured to:
when the entrance door has been opened, acquire personal information of a recipient facing the mobile body;
verify the recipient against the designated recipient based on the personal Information; and
when the recipient is the designated recipient, authenticate a delivery of the package.

6. The mobile body according to claim 5,
wherein, in the authentication processing, the one or more processors are configured to:
when the entrance door has been opened since before a start of the authentication processing, acquire personal information of a recipient facing the mobile body;
verify the recipient against the designated recipient based on the personal information; and
when the recipient is the designated recipient, authenticate a delivery of the package.

7. A delivery system configured to include a mobile body configured to travel autonomously and deliver a package to a designated destination, and a management server connected to the mobile body via a communication network, the system comprising:
one or more processors configured to perform an authentication processing to authenticate a delivery of the package when the mobile body arrives at the destination,
wherein, in the authentication processing, the one or more processors are configured to:
acquire door status information including opening/closing status of an entrance door of the destination;
determine whether the entrance door of the destination has been opened based on the door status information; and
authenticate a delivery of the package to the destination when the entrance door has been opened.

8. A delivery method for a computer to cause a mobile body to travel autonomously and deliver a package to a designated destination,
wherein, when the mobile body arrives at the destination, the computer is configured to execute:
acquiring door status information, which is information on the opening/closing status of an entrance door of the destination;
determining whether the entrance door of the destination has been opened based on the door status information; and
authenticating delivery of the package to the destination when the entrance door has been opened.

* * * * *